(12) United States Patent
Yeri et al.

(10) Patent No.: US 8,583,550 B1
(45) Date of Patent: Nov. 12, 2013

(54) FINANCIAL ACCOUNT RELATED TRIGGER FEATURE FOR DETECTING CHANGES IN FINANCIAL RATIOS

(75) Inventors: Naveen G Yeri, Charlotte, NC (US);
Timothy J Bendel, Charlotte, NC (US);
David Joa, San Bruno, CA (US);
Thayer S Allison, Jr., Charlotte, NC (US); Deepak Verma, Middletown, DE (US); Yanghong Shao, Charlotte, NC (US); Srihari Rao Gatpa, Andhra Pradesh (IN); Jade Michelle Le Vo-Dinh, Charlotte, NC (US); David Neil Joffe, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/486,739

(22) Filed: Jun. 1, 2012

(51) Int. Cl.
*G06Q 40/00* (2012.01)

(52) U.S. Cl.
USPC ............ 705/39; 705/35; 705/36 R; 705/37; 705/38; 705/40; 705/44

(58) Field of Classification Search
USPC ................. 705/37–40, 44, 35–36 R
See application file for complete search history.

(56) References Cited

U.S. PATENT DOCUMENTS

| | | | |
|---|---|---|---|
| 2009/0024496 A1* | 1/2009 | Balachandran et al. | 705/34 |
| 2009/0292632 A1* | 11/2009 | Dheer et al. | 705/35 |
| 2010/0145857 A1* | 6/2010 | Davila et al. | 705/44 |

OTHER PUBLICATIONS

Chemical Unveils Basic Bank Account; NY Campaign Targets Blacks, Hispanics; Shoultz, Donald. American Banker (pre-1997 Fulltext) [New York] Nov. 24, 1987: 2.*
Chemical Unveils Basic Bank Account; NY Campaign Targets Blacks, Hispanics; Shoultz, Donald. American Banker (pre-1997 Fulltext) [New York, N.Y] Nov. 24, 1987: 2.*
Credit scoring with uncertain class definitions; Kelly etl.; Oct. 1999; ISSN: 0953-0061.*

* cited by examiner

*Primary Examiner* — Harish T. Dass
(74) *Attorney, Agent, or Firm* — Moore and Van Allen, PLLC; Michael A. Springs; Peter B. Stewart

(57) ABSTRACT

Systems and methods for producing and maintaining account related triggers are provided herein. The systems and methods may be utilized for monitoring of one or more accounts of a financial institution. Triggers may be executed to monitor financial account ratios. Offers may be triggered based on the account ratios or changes in the account ratios.

19 Claims, 12 Drawing Sheets

| Date | Week Day | Trigger | Frequency | LCL | Count | UCL | Alert Type | Action |
|---|---|---|---|---|---|---|---|---|
| 1-Dec | Thurs | Trigger-1 | Daily | 45831 | 104860 | 87014 | Outlier | Supress |
| 1-Dec | Thurs | Trigger-2 | Daily | 76 | 77 | 172 | Normal | |
| 2-Dec | Fri | Trigger-1 | Daily | 87759 | 81205 | 159389 | Outlier | Supress |
| 2-Dec | Fri | Trigger-2 | Daily | 1259 | 1269 | 1658 | Normal | |
| 3-Dec | Sat | Trigger-1 | Daily | 0 | 0 | 0 | | |
| 3-Dec | Sat | Trigger-2 | Daily | 0 | 0 | 0 | | |
| 4-Dec | Sun | Trigger-1 | Daily | 0 | 0 | 0 | | |
| 4-Dec | Sun | Trigger-2 | Daily | 0 | 0 | 0 | | |
| 5-Dec | Mon | Trigger-1 | Daily | 86843 | 107066 | 157455 | Normal | |
| 5-Dec | Mon | Trigger-2 | Daily | 44 | 104 | 113 | Normal | |
| 6-Dec | Tues | Trigger-1 | Daily | 53464 | 60214 | 111612 | Normal | |
| 6-Dec | Tues | Trigger-2 | Daily | 56 | 248 | 100 | Outlier | Supress |
| 7-Dec | Wed | Trigger-1 | Daily | 47692 | 53416 | 77858 | Normal | |
| 7-Dec | Wed | Trigger-3 | Daily | 23267 | 31138 | 44186 | Normal | |
| 7-Dec | Wed | Trigger-2 | Daily | 44 | 30 | 84 | Outlier | Supress |
| 8-Dec | Thurs | Trigger-1 | Daily | 47874 | 56286 | 81416 | Normal | |
| 8-Dec | Thurs | Trigger-3 | Daily | 23267 | 28823 | 44186 | Normal | |
| 8-Dec | Thurs | Trigger-2 | Daily | 76 | 112 | 172 | Normal | |
| 9-Dec | Fri | Trigger-1 | Daily | 84956 | 89824 | 156820 | Normal | |
| 9-Dec | Fri | Trigger-3 | Daily | 23267 | 30392 | 44186 | Normal | |
| 9-Dec | Fri | Trigger-2 | Daily | 1259 | 1646 | 1658 | Normal | |
| 10-Dec | Sat | Trigger-1 | Daily | 0 | 0 | 0 | | |

FIG. 8B

| Trigger | Description |
|---|---|
| Regular Income/Outflow Necessities (INFLOW1) | Ratio of income versus payments required to run the household (basic necessities)<br>- Greater than 1 signifies true savings<br>-less than 1 signifies spending (or spending supplemented from another source) |
| Other Income/Total Inflow (INFLOW2) | Ratio of income from competitor institutions to total inflow.<br>- Greater than 50% signifies reliance on competitors<br>-Less than 50% signifies otherwise |
| Outflow Necessities/Outflow discretionary (OUTFLOW) | Ratio of payments of necessities vs discretionary |
| Total Inflow/Total Outflow (OVERALL) | Ratio of Total income to Total outflow.<br>- Greater than 1 signifies savings;<br>-less than 1 signifies spending (compare YoY to smooth out seasonality) |

FIG. 9

FINANCIAL ACCOUNT RELATED TRIGGER FEATURE FOR DETECTING CHANGES IN FINANCIAL RATIOS

BACKGROUND

Customers of financial institutions often find it difficult to keep track of their account activities. These customers may be unaware of the details of their transactions, account balances, and account policies and may miss potential opportunities and susceptibilities associated with their accounts. For example, a customer may not realize that they are eligible for an upgraded service because they are unfamiliar with their bank's policies and products. Moreover, financial institutions usually have large volumes of data to organize and maintain, and may not have the resources to easily analyze the data and keep customers informed. Such financial institutions may miss opportunities for growth by failing to inform their customers of possible issues, offers, and product updates at the most opportune times. For example, a financial institution may fail to timely notify a customer of an investment offer and may miss an opportunity to strengthen their relationship with the customer as a consequence.

BRIEF SUMMARY

The embodiments provided herein are directed to a system for producing and maintaining account-related triggers. The system includes a computer apparatus including a processor and a memory; and a trigger software module stored in the memory, comprising executable instructions that when executed by the processor cause the processor to: receive account data associated with one or more accounts; store the account data in a storage device; determine patterns of account activity based on the account data; identify parameters associated with the patterns of account activity, the parameters comprising at least one of a transaction channel, transaction category, threshold amount, business name, stability indicator, and violation frequency; and form triggers based on the patterns of account activity and parameters.

In some embodiments, a system for monitoring one or more accounts of a financial institution is provided. The system includes a computer apparatus including a processor and a memory and a financial ratio software module stored in the memory. The module includes executable instructions that when executed by the processor causes the processor to receive account data associated with the one or more accounts, store the account data in a storage device, and execute triggers to monitor financial account ratios.

BRIEF DESCRIPTION OF THE SEVERAL VIEWS OF THE DRAWINGS

The present embodiments are further described in the detailed description which follows in reference to the noted plurality of drawings by way of non-limiting examples of embodiments of the present embodiments in which like reference numerals represent similar parts throughout the several views of the drawings and wherein:

FIG. 8B provides a table illustrating trigger data quality monitoring in accordance with various embodiments of the invention; and FIG. 9 provides a table illustrating various triggers in accordance with various embodiments of the invention.

DETAILED DESCRIPTION

Figure 1:
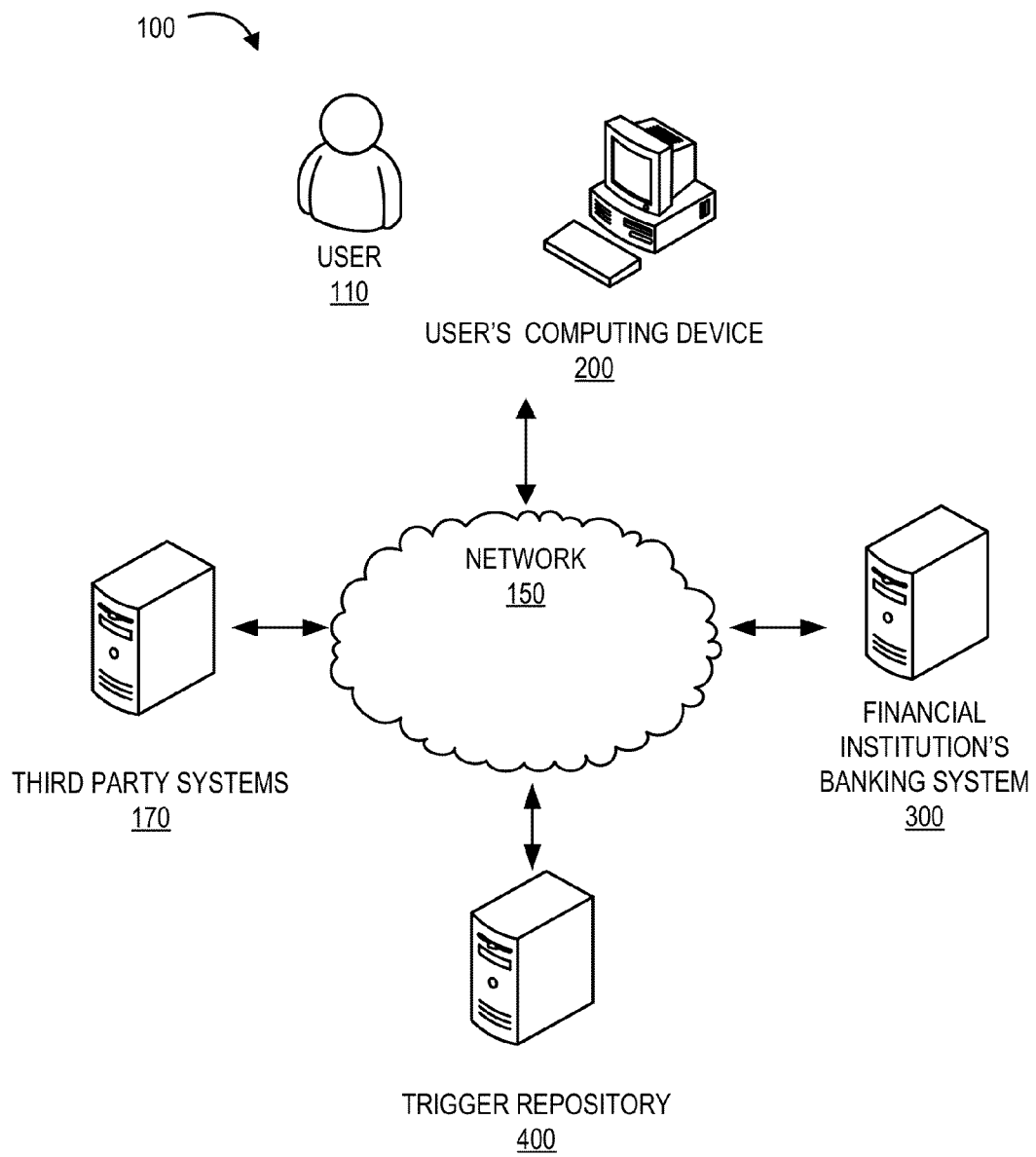
FIG. 1 provides a block diagram illustrating a trigger analysis system and environment in accordance with various embodiments of the invention.

The embodiments presented herein are directed to systems and methods for enhancing and maintaining customer relationships with an organization by the creation, institution, and management of account related triggers. In some embodiments, a system that supports ideation, sizing, design, production, and maintenance of triggers is provided. The system develops effective communication routines to aid in trigger delivery. Other embodiments are directed to monitoring data quality by checking historical volume and calculating high and low control limits to determine whether current volumes are in control. Such data quality monitoring minimizes false positives.

Other embodiments are directed to retaining users in their existing relationships with a financial institution. Based on account data, comparisons of past and current transactional activity are made and a slowdown in account usage is determined. In response to the determination, notifications are presented to the user to increase customer satisfaction and retain the customer relationship. Financial institutions find this approach desirable because it is more cost effective and profitable to retain existing relationships than it is to acquire new customers.

Still other embodiments are directed to increasing transactional depth or account breadth. Incoming and outbound transactions are evaluated over a period of time to identify accounts that are close to a certain threshold. Users are notified of their account status and prompted to increase account activity in order to gain extra benefits. In this way, financial institutions are able to understand their customer's needs and cross sell products. In further embodiments, the relationship with the user is enhanced by timely identifying outside transactions through account review. For example, withdrawals, opening new accounts with a competitor, or making competitor payments are identified and reviewed to avoid losing the user to a competitor.

Further embodiments focus on providing new products to a user by identifying inbound and outbound transactions that signify a change in account activity or relate to a particular type of transaction. Triggers related to payment types and increases in deposit amounts are identified to enable a financial institution to cross sell products to users.

In other embodiments, account information is reviewed to identify accounts that have unavailable funds and fixed costs and users are presented policy information. In this way, users are educated so that they can avoid fixed costs and are made aware of available options so that they can make informed decisions.

As will be appreciated by one skilled in the art, aspects of the present embodiments of the invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that enhance and maintain customer relationships with a financial institution via financial account related triggers are provided. As used herein, the term "trigger" refers to, but is not limited to, account activity, transactional data, account costs, account terms and conditions associated with one or more financial accounts, and non-financial data such as online data. Exemplary triggers include transactions and/or events associated with various accounts, such as a checking account, savings account, credit card account, retirement account, investment vehicle, or other type of account. Non-financial exemplary triggers include referrals from an online domain and online cookies. Specific events or trends in account or online activity are used to accomplish various objectives in the support and maintenance of user accounts to thereby increase user satisfaction and account profitability.

Referring now to the figures, FIG. 1 provides a block diagram illustrating a trigger analysis system and environment 100, in accordance with an embodiment of the invention. The trigger analysis environment 100 includes a user 110, and an associated computing device 200. A user of the system may be an individual account holder, an agent of the account holder, a customer of a financial institution, or any other entity that is capable of maintaining a financial account. The computing device 200 may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, or other mobile device.

The computing device 200 is configured to communicate over a network 150 with a financial institution's banking system 300 and, in some cases, a third party system 170, such as one or more other financial institution systems, a vendor's system, an online domain, a POS (point of sales) device, and the like. The user's computing device 200, the financial institution's banking system 300, and a trigger repository 400 are each described in greater detail below with reference to FIGS. 2-4. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

In general, the computing device 200 is configured to connect with the network 150 to log the user 110 into the financial institution's banking system 300, such as an online banking system. The computing device 200 is also configured to connect with the network 150 to allow the user 110 to access the third party system 170, such as an online domain. The banking system 300 involves authentication of a user in order to access the user's account on the banking system 300. For example, the banking system 300 is a system where a user 110 logs into his/her account such that the user 110 or other entity can access data that is associated with the user 110. For example, in one embodiment of the invention, the banking system 300 is an online banking system maintained by a financial institution. In such an embodiment, the user 110 can use the computing device 200 to log into the banking system 300 to access the user's online banking account. Logging into the banking system 300 generally requires that the user 110 authenticate his/her identity using a user name, a passcode, a cookie, a biometric identifier, a private key, a token, and/or another authentication mechanism that is provided by the user 110 to the banking system 300 via the computing device 200. The financial institution's banking system 300 is in network communication with other devices, such as the third party system 170 and the trigger repository 400.

In some embodiments of the invention, the trigger repository 400 is configured to be controlled and managed by one or more third-party data providers (not shown in FIG. 1) over the network 150. In other embodiments, the trigger repository 400 is configured to be controlled and managed over the network 150 by the same entity that maintains the financial institution's banking system 300. In other embodiments, the trigger repository 400 is configured to be controlled and managed over the network 150 by the financial institution implementing the trigger system of the present embodiments of the invention. In still other embodiments, the trigger repository 400 is a part of the banking system 300.

Figure 2:
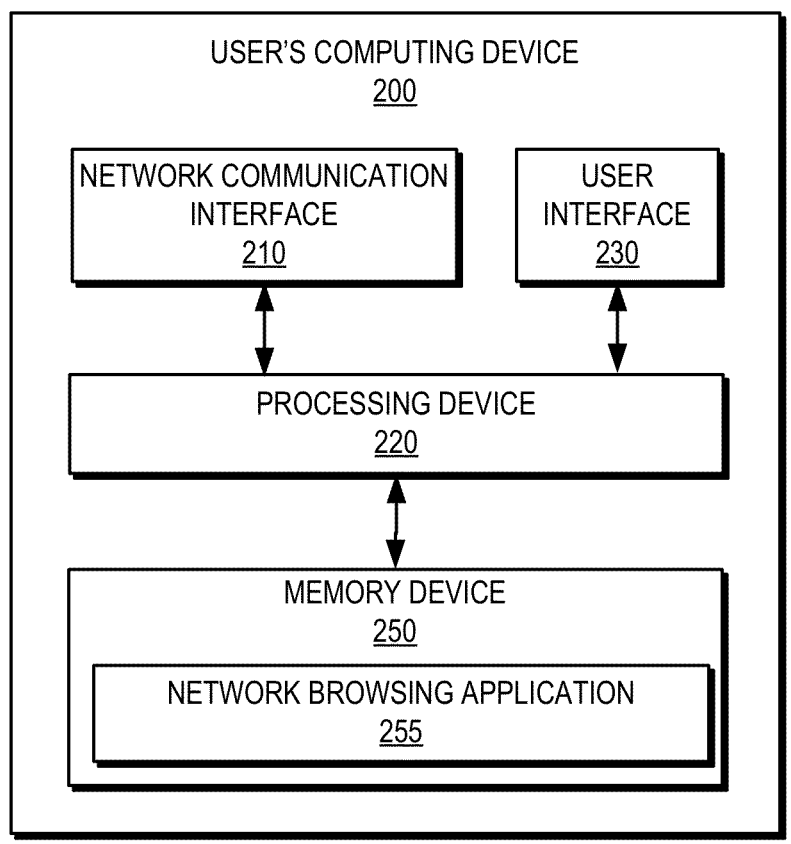
FIG. 2 provides a block diagram illustrating the user's computing device of FIG. 1, in accordance with various embodiments of the invention.

Referring now to FIG. 2, the computing device 200 associated with the user 110 includes various features, such as a network communication interface 210, a processing device 220, a user interface 230, and a memory device 250. The network communication interface 210 includes a device that allows the computing device 200 to communicate over the network 150 (shown in FIG. 1). In addition, a network browsing application 255 is stored in the memory device 250. The network browsing application 255 provides for the user to establish network communication with the banking system 300 (shown in FIG. 1) for the purpose of communicating account information to the banking system 300, in accordance with embodiments of the present embodiments of the invention.

As used herein, a "processing device," such as the processing device 220 or the processing device 320, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 220 or 320 may further include functionality to operate one or more software programs based on computer-executable program code thereof, which may be stored in a memory. As the phrase is used herein, a processing device 220 or 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 230 generally includes a plurality of interface devices that allow a customer to input commands and data to direct the processing device to execute instructions. As such, the user interface 230 employs certain input and output devices to input data received from the user 110 or output data to the user 110. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 250 or 350 generally refers to a device or combination of devices that store one or more forms of computer-readable media and/or computer-executable program code/instructions. Computer-readable media is defined in greater detail below. For example, in one embodiment, the memory device 250 or 350 includes any computer memory that provides an actual or virtual space to temporarily or permanently store data and/or commands provided to the processing device 220 when it carries out its functions described herein.

Figure 3:
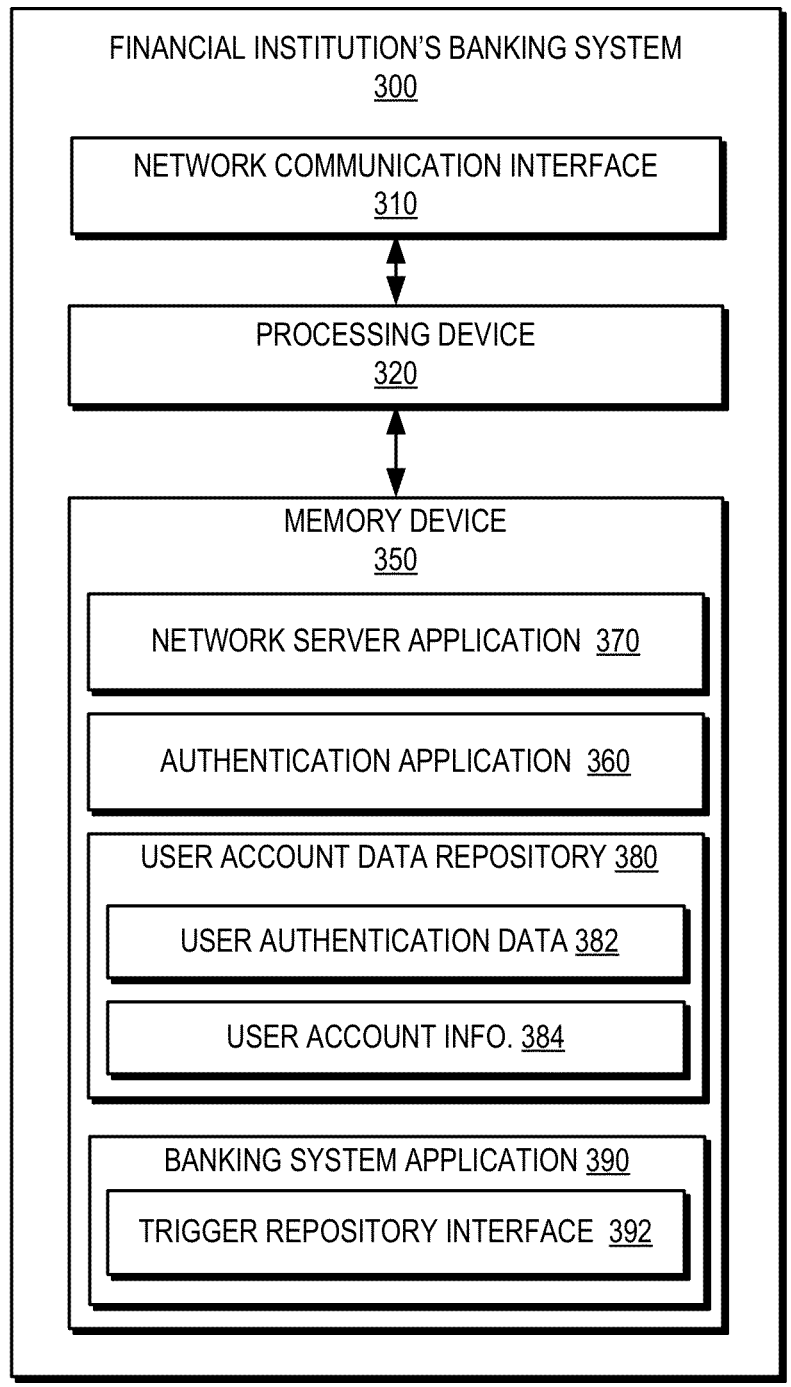
FIG. 3 provides a block diagram illustrating the financial institution's banking system of FIG. 1, in accordance with various embodiments of the invention.

FIG. 3 provides a block diagram illustrating the banking system 300 in greater detail, in accordance with embodiments of the invention. In one embodiment of the invention, the banking system 300 includes a processing device 320 operatively coupled to a network communication interface 310 and a memory device 350. In certain embodiments, the banking system 300 is operated by a first entity, such as a financial institution, while in other embodiments, the banking system 300 is operated by an entity other than a financial institution.

It should be understood that the memory device 350 may include one or more databases or other data structures/repositories. The memory device 350 also includes computer-executable program code that instructs the processing device 320 to operate the network communication interface 310 to perform certain communication functions of the banking system 300 described herein. For example, in one embodiment of the banking system 300, the memory device 350 includes, but is not limited to, a network server application 370, an authentication application 360, a user account data repository 380, which includes user authentication data 382 and user account information 384, and a banking system application 390, which includes a trigger repository interface 392 and other computer-executable instructions or other data such as a trigger software module. The computer-executable program code of the network server application 370, the authentication application 360, or the banking system application 390 may instruct the processing device 320 to perform certain logic, data-processing, and data-storing functions of the online system 700 described herein, as well as communication functions of the banking system 300.

In one embodiment, the user account data repository 380 includes user authentication data 382 and user account information 384. The network server application 370, the authentication application 360, and the banking system application 390 are configured to implement user account information 384 and the trigger repository interface 392 when monitoring the trigger data associated with a user account. The banking system application 390 includes a trigger software module for performing the steps of methods and systems 500-1100.

As used herein, a "communication interface" generally includes a modem, server, transceiver, and/or other device for communicating with other devices on a network, and/or a user interface for communicating with one or more customers. Referring again to FIG. 3, the network communication interface 310 is a communication interface having one or more communication devices configured to communicate with one or more other devices on the network 150, such as the personal computing device 200, the banking system 300, the third party system 170, and the trigger repository 400. The processing device 320 is configured to use the network communication interface 310 to transmit and/or receive data and/or commands to and/or from the other devices connected to the network 150.

Figure 4:
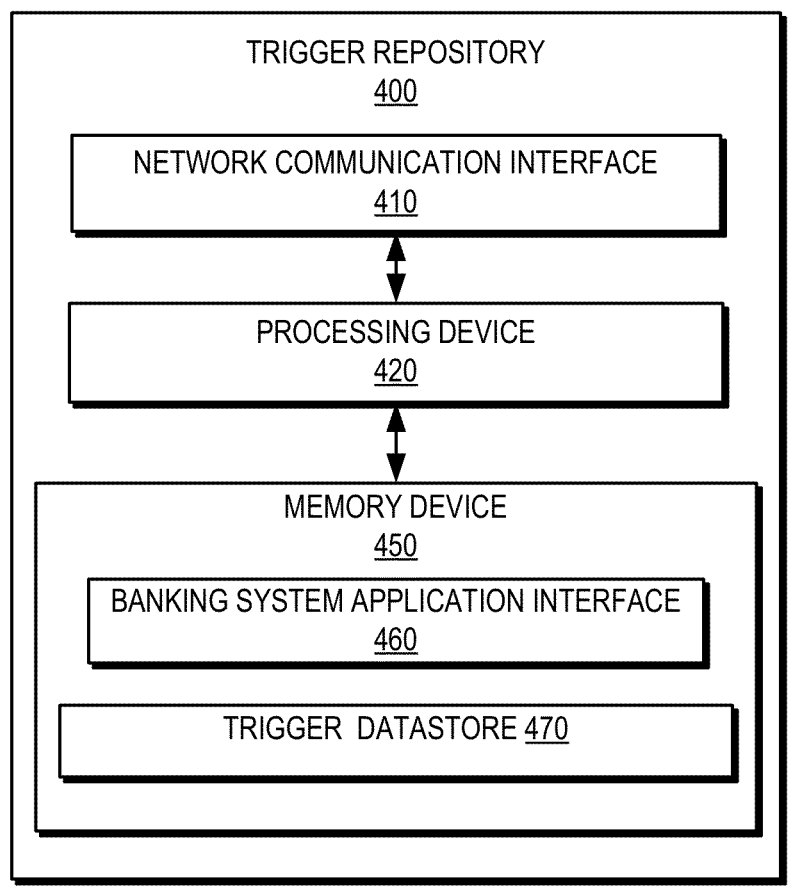
FIG. 4 provides a block diagram illustrating the trigger repository of FIG. 1, in accordance with various embodiments of the invention.

FIG. 4 provides a block diagram illustrating the trigger repository 400, in accordance with an embodiment of the invention. In one embodiment of the invention, the trigger repository 400 is operated by a second entity that is a different or separate entity from the first entity (e.g., the financial institution) that, in one embodiment of the invention, implements the banking system 300. In one embodiment, the trigger repository 400 could be part of the banking system 300. In another embodiment, the trigger repository 400 is a distinct entity from the banking system 300. As illustrated in FIG. 4, the trigger repository 400 generally includes, but is not limited to, a network communication interface 410, a processing device 420, and a memory device 450. The processing device 420 is operatively coupled to the network communication interface 410 and the memory device 450. In one embodiment of the trigger repository 400, the memory device 450 stores, but is not limited to, a banking system interface 460 and a trigger data store 470. The trigger data store 470 stores data including, but not limited to, triggers, account activity, including transaction and account costs for the user's financial institution account, other trigger related data, and mobile numbers or email address for the user's 110 account. In one embodiment of the invention, both the banking system interface 460 and the trigger data store 470 may associate with applications having computer-executable program code that instructs the processing device 420 to operate the network communication interface 410 to perform certain communication functions involving the trigger data store 470 described herein. In one embodiment, the computer-executable program code of an application associated with the trigger data store 470 may also instruct the processing device 420 to perform certain logic, data processing, and data storing functions of the application associated with the trigger data store 470 described herein. A trigger, as defined herein, is not limited to account activity, and may further include costs, policies, and conditions associated with an account and online data.

The network communication interface 410 is a communication interface having one or more communication devices configured to communicate with one or more other devices on the network 150. The processing device 420 is configured to use the network communication interface 410 to receive information from and/or provide information and commands to the user's computing device 200, the third party system 170, the trigger repository 400, the banking system 300 and/or other devices via the network 150. In some embodiments, the processing device 420 also uses the network communication interface 410 to access other devices on the network 150, such as one or more web servers of one or more third-party data providers. In some embodiments, one or more of the devices described herein may be operated by a second entity so that the third-party controls the various functions involving the trigger repository 400. For example, in one embodiment of the invention, although the banking system 300 is operated by a first entity (e.g., a financial institution), a second entity operates the trigger repository 400 that stores the trigger details for the customer's financial institution accounts and other information about users.

As described above, the processing device 420 is configured to use the network communication interface 410 to gather data from the various data sources. The processing device 420 stores the data that it receives in the memory device 450. In this regard, in one embodiment of the invention, the memory device 450 includes datastores that include, for example: (1) triggers associated with a user's financial institution account numbers and routing information, (2) information about sending and receiving users' mobile device numbers, email addresses, or other contact information, which may have been received from the banking system 300, and (3) online data such as browser cookies associated with the user's computing device 200.

Turning now to the production of triggers, in some embodiments, trigger ideas are formulated and undergo a preliminary review. The ideas may be formulated internally, such as by a team of analysts of a financial institution, or the ideas may be formulated externally by segment, channel, and marketing partners of a financial institution. The ideas are prioritized based on an opportunity analysis. For example, transaction channels, transaction categories, business names, amount thresholds, stability, and violation frequencies are selected to determine and quantify opportunities that can be generated from the trigger ideas. These opportunities, such as customer retention and policy education, may be analyzed in view of preferred, retail, and small business demographics. Based on the opportunity review, triggers are developed through rigorous testing. For example, tests may be conducted on transactions associated with a specific account or user. Further, triggers that are similar in scope and that overlap over the same time period may be monitored to further develop the trigger. The results of the testing may then be reviewed to finalize the triggers. In some embodiments, the triggers are modified for automation. For example, the code for automating the triggers may be embellished and specific parameters provided. In further embodiments, the automated triggers are monitored. For example, content and process quality trigger checks can be run on a daily, weekly, bi-weekly, and/or monthly basis.

Figure 5A:
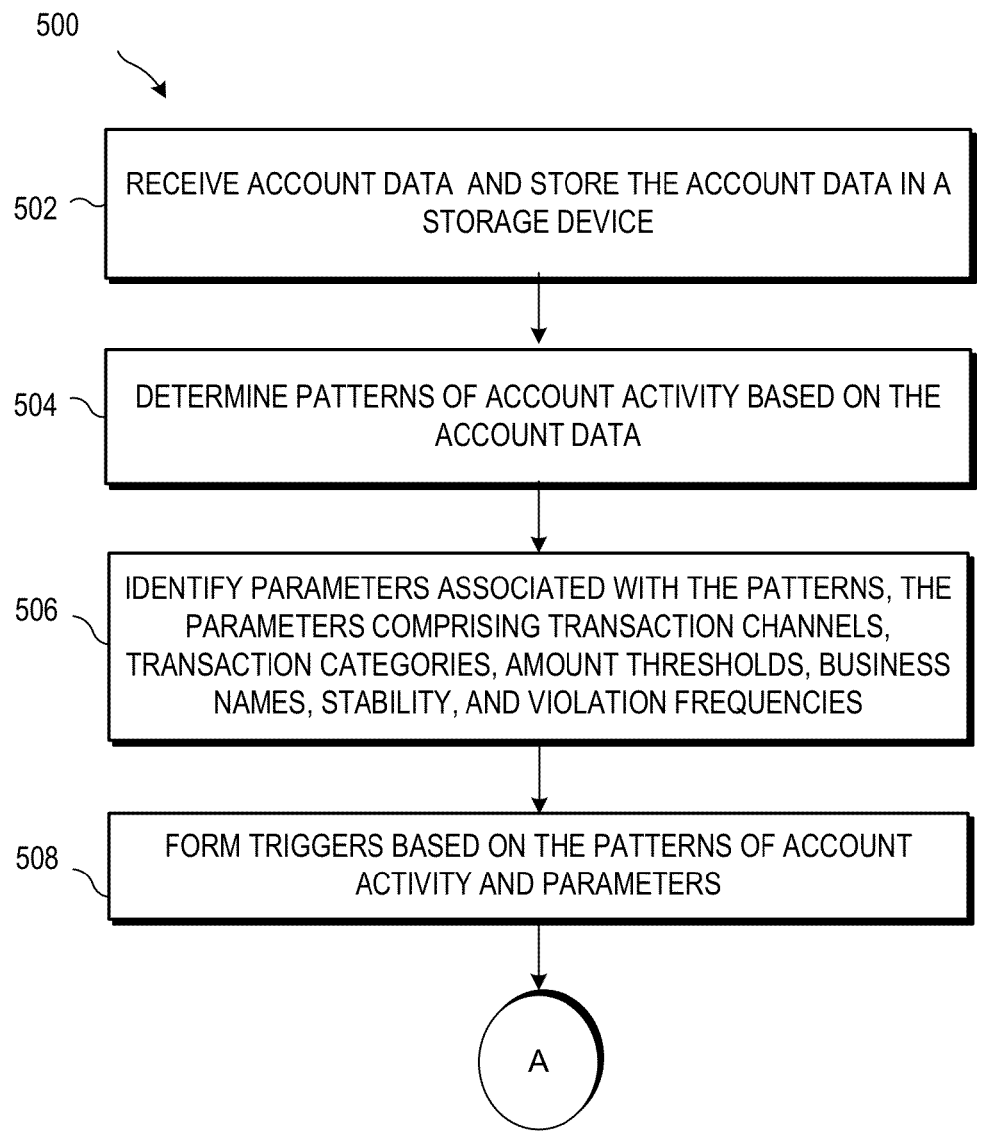
FIGS. 5A-5B are flowcharts illustrating a system and method for producing and maintaining triggers in accordance with various embodiments of the invention.
Figure 5B:
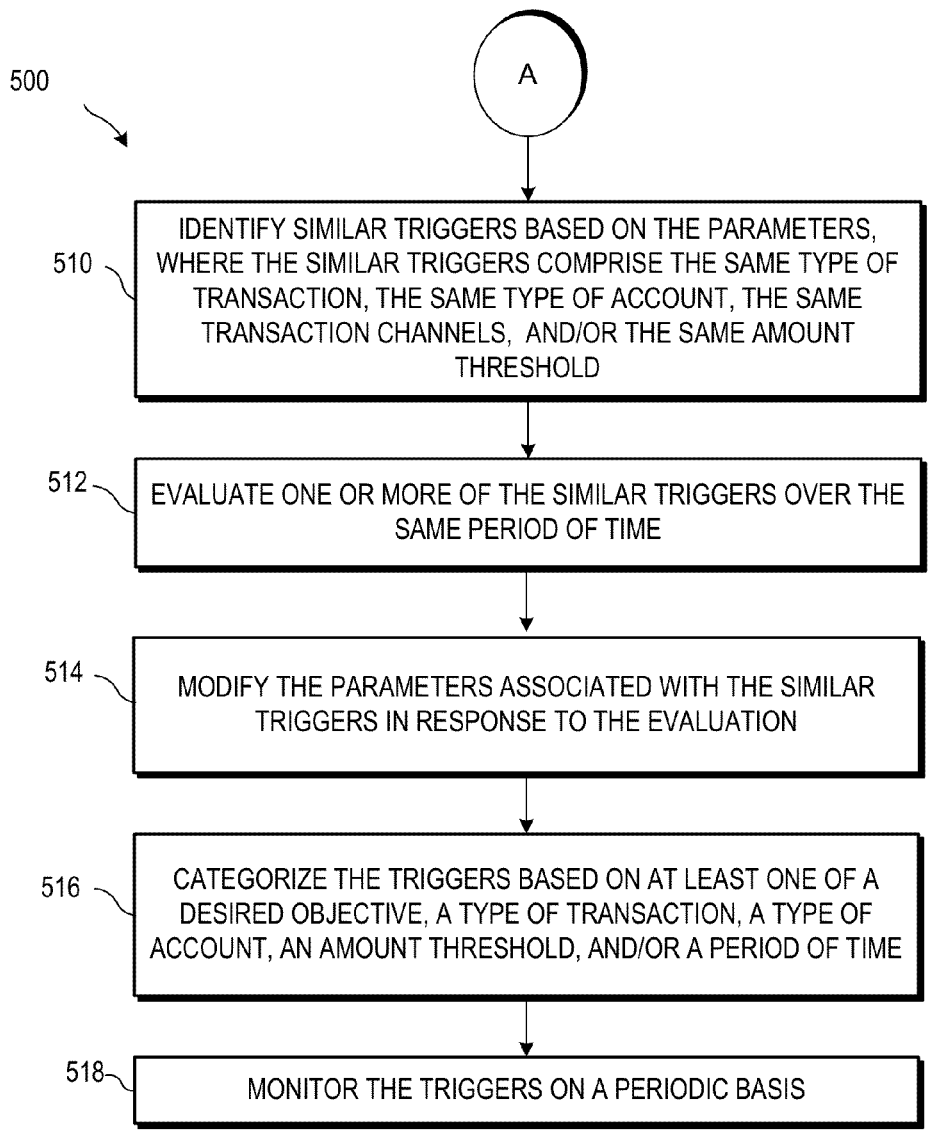

FIGS. 5A-5B are flowcharts providing an overview of a system and method 500 for producing and maintaining triggers. One or more devices, such as one or more mobile devices and/or one or more other computing devices and/or servers, can be configured to perform one or more steps of the method 500, as well as the methods 600-1100. In some embodiments, the one or more devices performing the steps are associated with a financial institution. In other embodiments, the one or more devices performing the steps are associated with a business, partner, third party, and/or user.

As shown in FIG. 5A, at block 502, account data is received and stored in a storage device (e.g., the user account data repository 380 or the trigger repository 400). A used herein, "account data" includes, but is not limited to any data associated with one or more financial accounts such as transaction amounts, inbound transactions, outbound transactions, transaction channels, transaction categories, transaction dates, identification of third parties to a transaction, payee names, purpose of transactions, transaction transfer data, types of accounts, costs associated with the account, account balances, and the like. The account data may be received from the user, merchants, other financial institutions such as credit card companies, or any other entity.

In block 504, patterns of account activity are determined based on the account data. The account activity, in some embodiments, is specifically linked to a transaction category, transaction type, transaction amount, or transaction channel. For example, algorithms may be used to detect upward or downward trends in the number of transactions, the amount of transactions, the occurrence of account costs, or other account activity over a period of time. Deposit amounts for a particular account, for example, may increase during the month of April for several years in a row and provide an indication that the account user has received a tax refund.

In block 506, parameters associated with the patterns are identified, where the parameters include transaction channels, transaction categories, amount thresholds, business names, stability, and violation frequencies. The parameters are identified, in some embodiments, by using algorithms, keywords, Boolean, transaction channel codes, transaction amount calculations, and threshold amounts to search the account data related to the patterns of account activity. The keywords include business names, merchant names, third party financial institution names, web addresses, transaction dates, transaction amounts, user identification, account identification, and the like.

Transaction channels include transaction processes such as electronic funds transfers, automatic deposits and withdrawals, ATM withdrawals and deposits, point-of-sale (POS) purchases, and the like. For example, triggers directed to deposit transactions may include transaction channel parameters such as teller deposits, ATM deposits, ACH deposits, internal transfers, automatic transfers, and pay roll transfers.

Transaction categories include transactions that are grouped according to a desired outcome or purpose. Exemplary transaction categories include user retention, increasing a user's transactional depth or account breadth, timely identification of outside transactions, new products, risk mitigation, policy education, and the like.

The amount thresholds include predetermined amounts associated with one or more transactions such as minimum and/or maximum percent, total, average, or median limits for quantities or values associated with one or more transactions. For example, some parameters may require that all purchases be over a minimum $100 limit and/or under a $10,000 limit. The stability parameters provide an indication of transactions that perform consistently over time, or an indication of transactions that have been adjusted to remove variations in activity over time. For example, the stability parameters may include a range of percentages, ratios, transaction amounts, and frequencies that fall within specific tolerances and that are linked to specific transactions that are tracked over time. Parameters of violation frequencies indicate the frequency of outliers, unexpected events, and negative results in account activity. For example, if the number of ATM withdrawals for a particular account has gradually decreased from six per month to one per month over the last seven months, seven ATM withdrawals on the same day of the current month would indicate a reversal in the trend and would be a violation of the trigger. The violation frequency can indicate an isolated occurrence which can be deleted or ignored from the data, or it can indicate a negative trend. Based on the violation frequency, the parameters of the triggers can be adjusted accordingly.

In block 508, triggers are formed based on the patterns of account activity and the parameters. In some embodiments, the patterns of account activity and the parameters are used to define the triggers. For example, a trigger may be defined by the total monthly number of ATM deposits that occur over a three month period. Further, the patterns of account activity provide the expected trend for transactions defined by the parameters. In the previous example, the trigger may be further defined by requiring that the total monthly number of ATM deposits decrease over the three month period. The patterns of account activity and parameters selected for each trigger may be based on the objective of the trigger. Triggers directed to cross selling investment products to user, for example, may include a pattern of increasing direct deposits in a saving account over a two week period. The triggers, and the patterns and parameters that define the triggers, may take on any number of variations. Specific exemplary triggers are described in more detail below with reference to FIG. 9.

The method 500 is further illustrated in FIG. 5B. In block 510, similar triggers are identified based on the parameters, where the similar triggers comprise the same type of transaction, the same type of account, the same transaction channels, and/or the same amount threshold. In some embodiments, the similar triggers are associated with one or more accounts and/or one or more users. The similar triggers can be associated with a single account or user, or multiple accounts of the same or different users. For example, a similar trigger may include all payment transactions associated with a particular user, where the payment transactions include use of a credit card, a checking account, or other account. In further embodiments, the similar triggers are identified based on a transaction category.

In block 512, one or more of the similar triggers are evaluated over the same period of time. The evaluation of the similar triggers over the same time periods strengthens the trigger data such that any potential flaws, improvements, or strengths in the data are highlighted. In one example, electronic fund transfers associated with multiple accounts are monitored every day over the same six month period. In this way, the number of times the trigger should be run in a week or month, the days of the week for running the trigger, and any discrepancies in the data that occur during particular days of the week, weeks of the month, and months of the year are determined. In some embodiments, a first group of similar triggers is compared to a second group of similar triggers. For example, a group of similar outbound transaction triggers may be compared to a group of similar inbound transaction triggers. In another example, automatic deposits that occur on Mondays may be compared to automatic deposits that occur on Fridays.

In block 514, the parameters associated with the similar triggers are modified in response to the evaluation of the one or more of the similar triggers over the same period of time. One or more of the parameters for a particular trigger can be added or removed and/or the terms of the parameters can be adjusted. Holidays and weekends, for example, may cause discrepancies in the preliminary trigger data and may be taken into account when defining the trigger. Even after the triggers are preliminarily established, the triggers may be continuously monitored on a regular basis as discussed in more detail below with regard to FIGS. 6A-6B.

In block 516, the triggers are categorized based at least on one of a desired objective, a type of transaction, a type of account, an amount threshold, and/or a period of time. In some embodiments, a first group of similar triggers and a different second group of similar triggers are categorized based on the desired objective. For example, ATM deposits may be categorized with payments for education if the purpose of the triggers is to offer the user a loan with a lower interest rate. The triggers categorized according to the desired objective are further categorized according to the type of transaction, the type of account, the amount threshold, and the period of time. In the example above, the ATM deposits used as triggers for the purpose of loan offers may be further categorized according to the amounts of the deposits. In block 518, the categorized triggers are monitored on a period basis, as discussed in further detail below with regard to FIGS. 6A-6B.

Figure 6A:
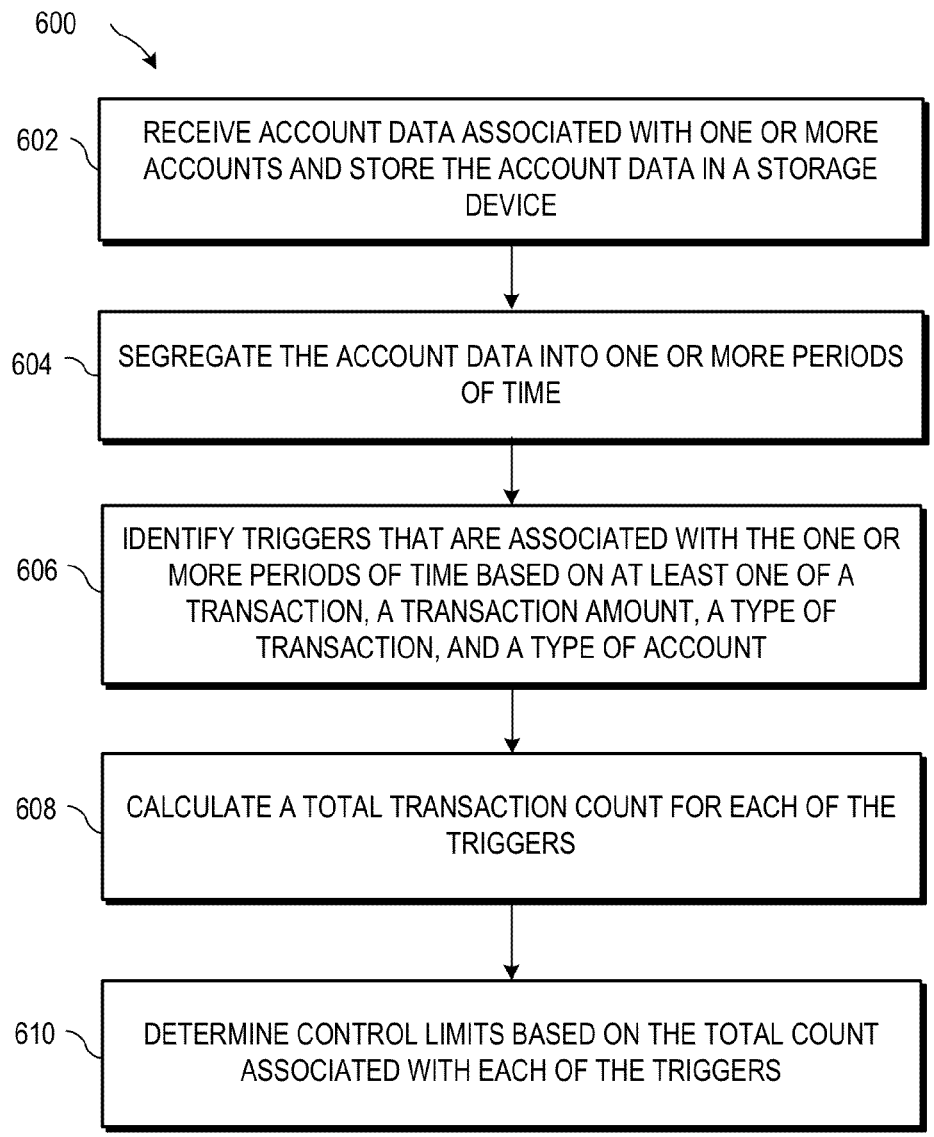
FIGS. 6A-6B are flowcharts illustrating a system and method for monitoring trigger data quality in accordance with various embodiments of the invention.
Figure 6B:
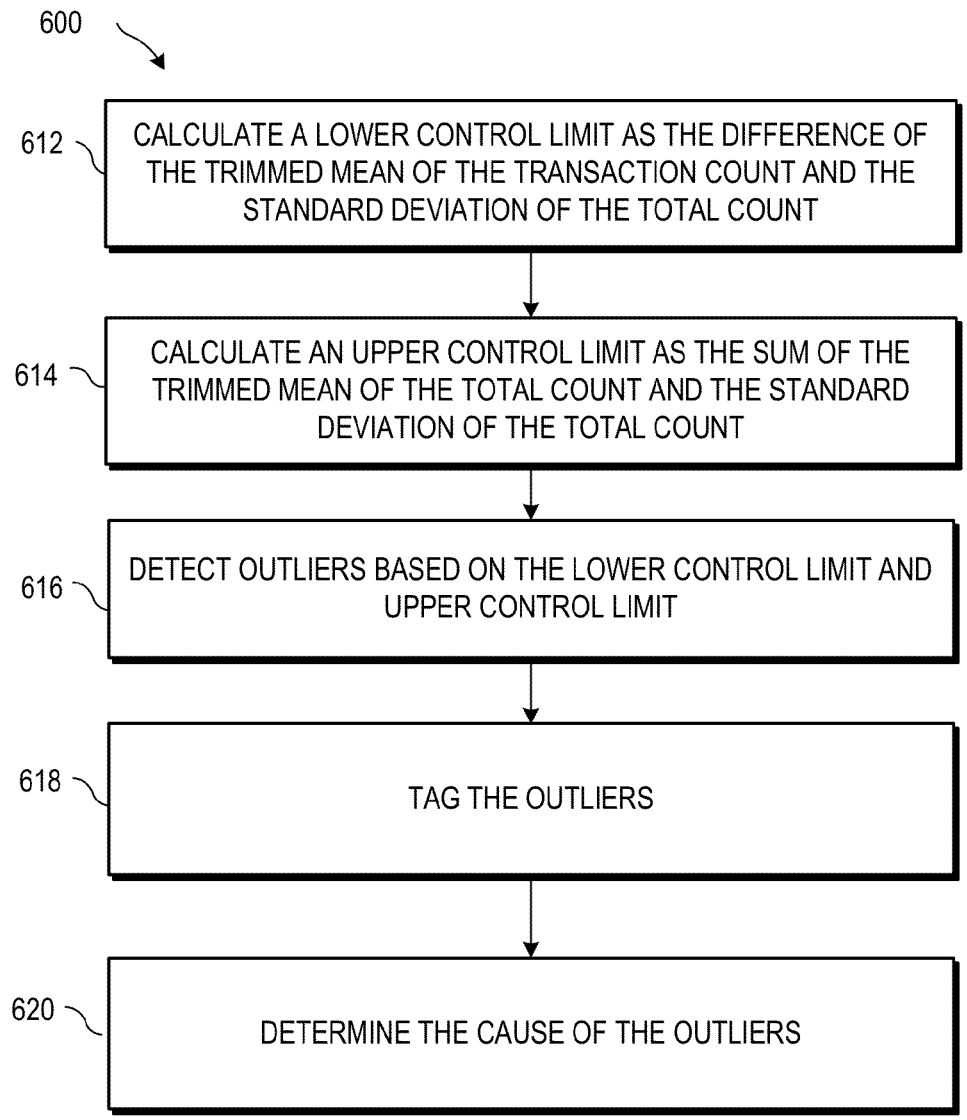

Referring now to FIGS. 6A-6B, flowcharts providing an overview of a system and method 600 for monitoring trigger data quality are provided. Because triggers have a very short life span, poor quality of data can lead to ineffective marketing and/or loss in revenue. The method 600 ensures that the right data is included in the triggers and detects potential definitional and process flaws in the triggers. The method 600 detects and reports whether the current trigger counts are normal or flawed in real time. The method 600 monitors the triggers to determine the accuracy, completeness, domain of values, and format of the trigger data. The triggers are further monitored to determine the relevance of the trigger metrics within a business context and explain how the metric score correlates to business performance. Also, the method 600 evaluates the soundness of all transformation processes, such as the categorization of the triggers.

In block 602 of FIG. 6A, account data associated with one or more accounts is received and stored in a storage device (e.g., the user account data repository 380 or the trigger repository 400). In block 604, the account data is segregated into one or more periods of time. For example, transactions may be divided into daily, weekly, monthly, quarterly, or yearly periods. The periods of time selected for segregating the account data are based on historical trends in the data. If deposits over $5,000 occurred only once per month over the last ten months, for example, then the data for such deposits would be segregated into monthly periods. By clustering data into specific time windows, seasonal, cyclic, and trend effects can be pinpointed as further discussed below with regard to FIG. 8A.

In block 606, triggers associated with the one or more periods of time are identified based on at least one of a transaction, a transaction amount, a type of transaction, and a type of account. In some embodiments, each set of triggers corresponding to transactions of a certain amount, and/or type are identified first and then the triggers are segregated into time periods. The triggers may be further identified based on a category corresponding to a desired objective. In some embodiments, the triggers are identified based on transactions that occur during the one or more periods of time. For example, a trigger may include all inbound transactions that have values that are greater than a threshold amount and that occur during the month of July.

In block 608, a total transaction count for each of the triggers is calculated. The transaction counts include value amounts for certain transactions associated with one or more accounts or the total number of certain transaction associated with the one or more accounts. In some embodiments, the transaction count is the total number of transactions that occur during the one or more period of time and that are associated with a particular trigger.

Figure 8A:
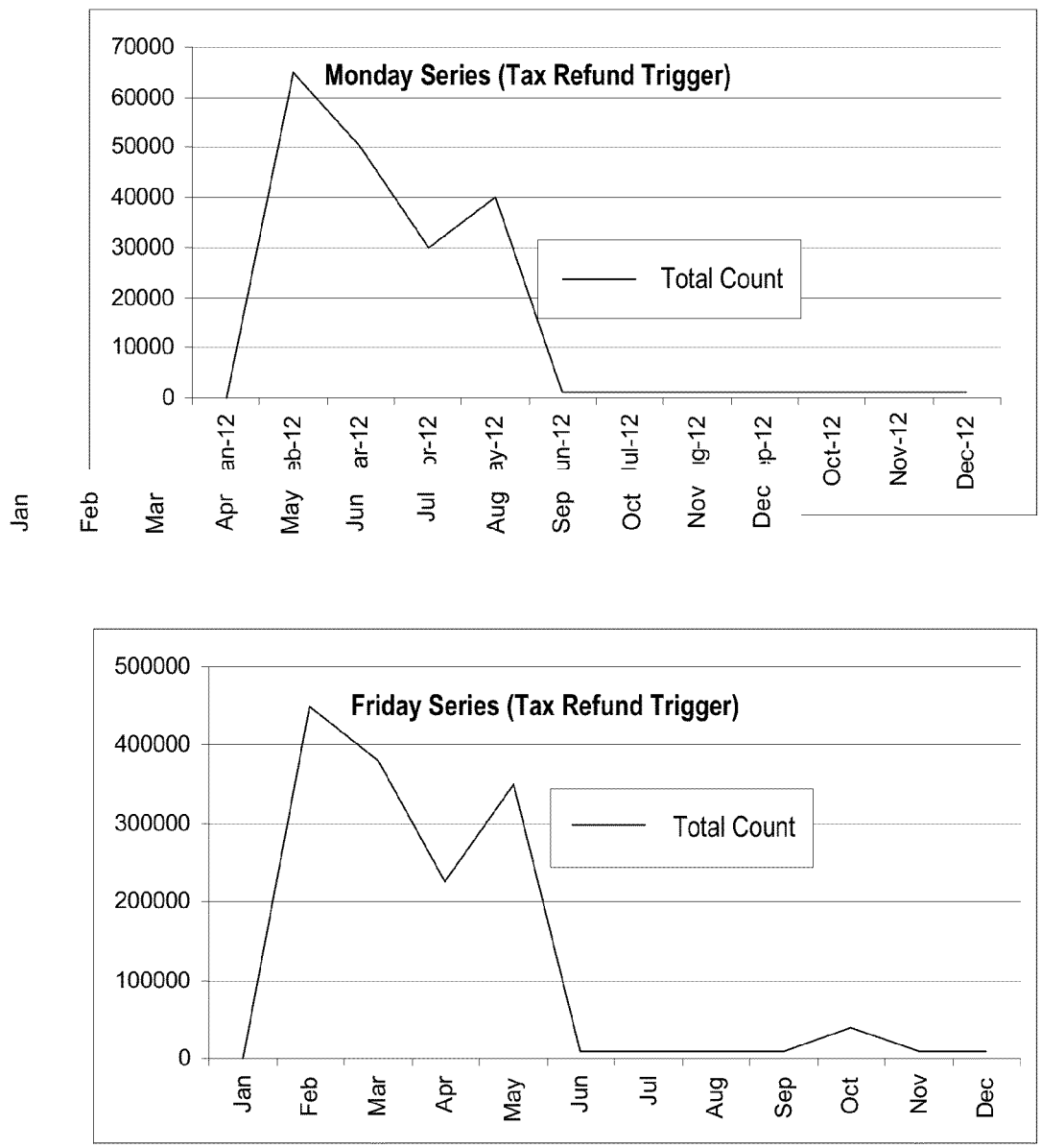
FIG. 8A provides graphical charts illustrating trigger data quality monitoring in accordance with various embodiments of the invention.

Exemplary graphical charts of total counts for a tax refund trigger are illustrated in FIG. 8A. In the Monday Series chart, the total transaction counts associated with tax refund triggers for the Mondays of every month of a particular year are charted. In the Friday Series chart, the total transaction counts associated with tax refund triggers for the Fridays of every month for the same particular year are charted. The data for Monday tax refunds can be compared to data for Friday tax refunds. The transaction counts for tax refund triggers during the months of February, March, April and May are much higher than the transaction counts for tax refunds during the rest of the year. And as shown in the Friday Series and Monday Series charts, the number of tax refunds is much higher on average for the Fridays in February to May than they are for the Mondays of the same period. Based on this data, the timing for sending users notifications of investment opportunities and product offers, for example, can be finely tuned such that the user receives offers at the most opportune times.

In block 610, control limits based on the transaction count for each of the triggers is determined. The control limits are calculated based on trimmed mean and standard deviation. Trimmed mean is calculated by removing a certain percent from the lowest percent of values and an equal certain percent from the highest percent of values in a given data series before calculating the mean. In calculating the trimmed mean, some of the lower numbers of the transaction count and some of the higher numbers of the transaction count are removed before the mean is calculated. For example, tax refund transactions that occur on a Friday and that have a value that is a certain percent higher or lower than the median for all tax refunds that occur on the same Friday are deleted before the mean is calculated.

FIG. 6B is a flowchart further illustrating the method and system 600. In block 612, a lower control limit is calculated as the difference of the trimmed mean of the transaction count and the standard deviation of the transaction count. In block 614, an upper control limit is calculated as the sum of the trimmed mean of the total count and the standard deviation of the total count. In block 616, outliers are detected based on the lower control limit and the upper control limit.

An exemplary table illustrating the transaction count and control limits is shown in FIG. 8B. The issue tracking table shows Trigger-1, Trigger-2, and Trigger-3, which are listed according to the date and the week day on which they occur. A lower control limit (LCL), a transaction count, and an upper control limit (UCL) are calculated daily for each trigger. The transaction count is the total number of transactions that occur for each of the Triggers 1-3 in a given day. Although a daily trigger data quality check is illustrated, it will be understood that the trigger check may be run on a weekly, monthly, or other time period basis. The LCL and UCL indicate whether a particular trigger is an outlier or a normal trigger. For example, Trigger-1 on Thursday, December 1 is tagged with an outlier alert based on the LCL and UCL numbers. The normal LCL for Trigger-1 on Thursday, December 8 is higher than the outlier LCL on December 1, and the normal UCL is lower than the outlier UCL on December 1. For triggers tagged as normal, the LCL and UCL remain constant from period to period. As shown in the table, normal Trigger-2 on Friday, December 2 and normal Trigger-2 on Friday, December 9 each has the same LCL and UCL numbers even though the total count for each day is different.

In block 618, the outliers are tagged. The outliers may be tagged as "outlier" as illustrated in the exemplary table of FIG. 8B or "fail" and suppressed automatically. In some embodiments, alerts are sent to analysts. For example, reports, graphs, tables, or other notifications may be sent to analysts for further processing. The analysts may decide to segregate, delete, modify, or retain the tagged or untagged trigger data. For example, one or more transactions associated with a particular trigger may be deleted and the transaction count recalculated for that particular trigger. In other embodiments, the triggers that exhibit a normal pattern and that are within confidence limits are tagged as "normal" or "pass."

In block 620, the cause of the outliers is determined. Periods of time around holidays, cyclic considerations such as tax season, days of the week, weeks of the month, certain historical trends, data obtained from the user, and external data can indicate the cause for the outliers. For example, historical trends may indicate that the number of mortgage payments is higher at the end of the month than at the beginning of the month and the number of ATM withdrawals may be higher on Fridays than it is on Tuesdays. As another example, triggers that include transactions having a specific threshold amount of $10 or greater may have a higher number of transactions during a particular period because a greater number of low end transactions (e.g., transaction of $10 to $12) occur during that period. Based on the cause of the skewed data, appropriate action can be taken. For example, the threshold amount or some other parameter associated with the trigger may be modified or certain triggers associated with a particular day of the week or other period may be tagged as normal even though these certain triggers would appear to be abnormal. Taking the $10 or greater trigger example described above, for example, the threshold amount for that trigger may be increased during the particular period or marked as normal. If the cause of the outliers is not easily explained or if the cause is unexpected, then further investigation may be required.

Although the triggers described herein generally include financial transactions associated with one or more accounts, such as the triggers illustrated in FIG. 9, it will be understood that the triggers may also include non-financial data such as online data. For example, online referrals from an online domain or partner website may be used as triggers. A user, in one example, may be referred to or redirected to a banking website or online product from a student preparatory web site. In another example, a system may be given permission to use browser cookies associated with the user's device to track non-financial and/or financial online activity.

Figure 7:
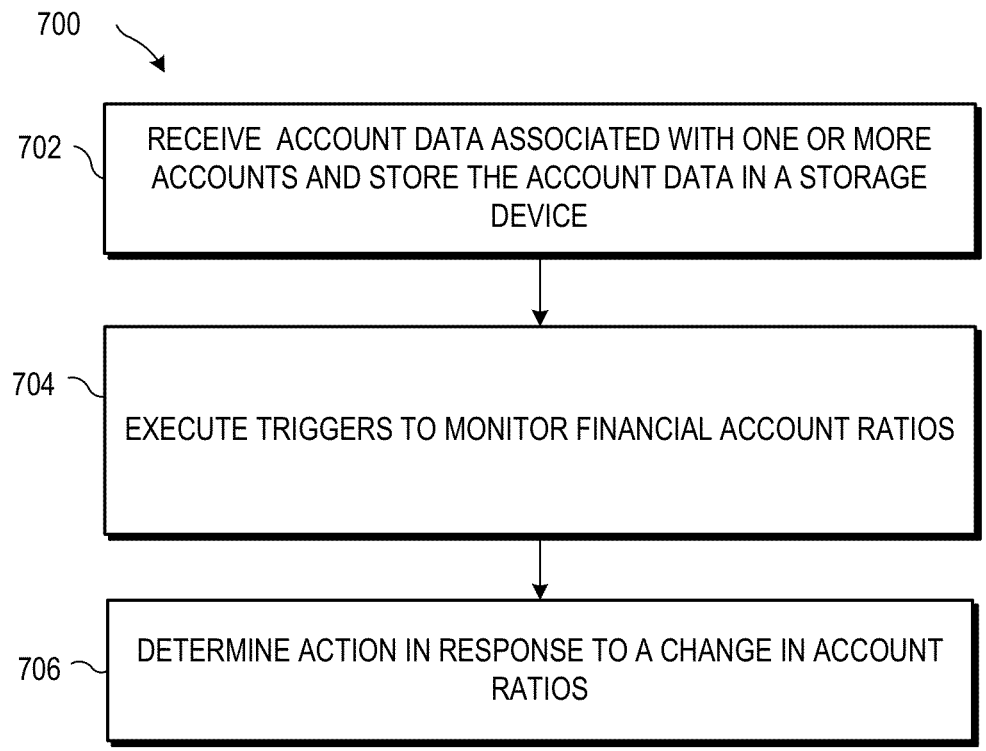
FIG. 7 is a flowchart illustrating a system and method for monitoring financial accounts in accordance with various embodiments of the invention.

FIG. 7 is a flowchart providing an overview of a system and method 700 for monitoring of one or more accounts with a financial institution are provided. Based on past and current account activity, an indication of a change in certain account ratios can be determined. The ratios can be any ratio of certain financial account transactions versus other financial account transactions. For example, the ratio of inflow of funds relative to outflow of funds may be a useful ratio to monitor (discussed further below).

In block 702, account data associated with one or more accounts are received and the account data is stored in a storage device (e.g., the user account data repository 380 or the trigger repository 400). In block 704, triggers are executed to monitor account ratios. The triggers may monitor one or more transactions that occur during a defined period of time, type of transaction, etc. In some embodiments, the defined period of time may be one week, one month, three months, one year, etc. The trigger groups may be further identified based on an amount, a transaction channel, an account type, and the like.

Exemplary trigger relating to the system and method 700 are illustrated in Trigger Table 1 of FIG. 9. The triggers in Table 1 are directed to exemplary ratios of the present invention. It will be understood that the types, quantity, duration, etc. of the transactions may be grouped in any manner suitable to produce a beneficial ratio. The first exemplary trigger noted in the table is denoted as "INFLOW1." The INFLOW1 trigger may serve to monitor the ratio of income versus payments required to run the household (basic necessities). A ratio of greater than 1 signifies true savings (which may be devoid of discretionary spending). Conversely, a ratio of less than 1 signifies spending or that income/spending are supplemented from another source. Large ratios would seemingly indicate that the customer has significant funds available after deducting necessities. Unique targeted marketing opportunities may be offered to customers with higher ratios. Opportunities include cross-selling, savings, investment, credit card offers, etc. On the other hand, small ratios may be indicative of a customer deepening opportunity. Even furthermore, sudden shifts in the ratio may be indicative of a positive or negative event.

The next exemplary trigger noted in table is "INFLOW2." The INFLOW2 trigger may serve to monitor the ratio of income from competitor institutions to total inflow. This ratio may be beneficial in determining the reliance on competitors. The "OUTFLOW" trigger may examine the ratio of payments of necessities vs. discretionary payments. The "OVERALL" trigger is a ratio of total income to total outflow. Again, greater than 1 signifies savings, whereas less than 1 signifies spending.

In block 706, the ratio data is analyzed and a determination is made as to what type of action (if any) to take. As noted above, a sudden shift in ratio data may be indicative of a one-time event such as an annual bonus or sudden unemployment. An algorithm may be utilized to select customers based on the ratios or changes in ratios for cross-selling opportunities to market additional services.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for monitoring of one or more accounts of a financial institution, the system comprising:
   a computer apparatus including a processor and a memory; and
   a financial ratio software module stored in the memory, comprising executable instructions that when executed by the processor cause the processor to:
      receive account data associated with the one or more accounts;
      store the account data in a storage device;
      execute triggers to monitor financial account ratios, wherein executing triggers comprises imposing account costs in response to determining a particular financial account ratio;
      trigger a notification to a user of the account costs when the account costs are imposed, the notification comprising an offer to a computing device associated with the user associated with forgiving the account costs;
      segregate the account data into a plurality of time periods;
      calculate the number of instances in which account costs were imposed during each time period in response to executing the triggers;
      determine whether the number of instances in which account costs were imposed during each time period in response to executing the triggers is within a lower control limit and an upper control limit; and
      based on determining that the number of instances in which account costs were imposed during a particular time period in response to executing the triggers is below the lower control limit or exceeds the upper control limit, transmit an outlier notification to a predefined analyst.

2. The system of claim 1, wherein executing triggers to monitor financial account ratios comprises:
   calculating the total value of the outbound transactions that occur during a first period of time and the total value of the inbound transactions the occur during the first period of time; and
   comparing the value of the outbound transactions and the total value of the inbound transactions.

3. The system of claim 2, wherein:
   executing triggers to monitor financial account ratios comprises determining that the total value of the outbound transactions is greater the total value of the inbound transactions by a specific amount; and
   the offer to the user associated with forgiving the account costs comprises a recommendation to the user comprising transferring the specific amount from a first account to a second account before the start of a second period of time, wherein the first period of time comprises a period of time that is prior to the second period of time.

4. The system of claim 3, wherein the outbound transactions comprise automatic withdrawals, internal transfers, and payments.

5. The system of claim 1, wherein executing triggers to monitor financial account ratios comprises:
   determining that a total value of the outbound transactions of the one or more accounts is greater than a total value of inbound transactions of the one or more accounts; and
   imposing account costs in response to determining that the total value of the outbound transactions is greater than the total value of the inbound transactions.

6. The system of claim 1, wherein executing triggers comprises imposing account costs for unavailable funds incurred for the first time in six months.

7. The system of claim 1, wherein executing triggers comprises imposing account costs when an account has gone to loss for the first time in six months.

8. A method for monitoring of one or more accounts of a financial institution, the method comprising:
   receiving account data associated with the one or more accounts;
   storing the account data in a storage device;
   executing, with a processor, triggers to monitor financial account ratios, wherein executing triggers comprises imposing account costs in response to determining a particular financial account ratio;
   triggering, with a processor, a notification to a user of the account costs when the account costs are imposed, the notification comprising an offer to a computing device associated with the user associated with forgiving the account costs;
   segregating, with a processor, the account data into a plurality of time periods;
   calculating, with a processor, the number of instances in which account costs were imposed during each time period in response to executing the triggers;
   determining, with a processor, whether the number of instances in which account costs were imposed during each time period in response to executing the triggers is within a lower control limit and an upper control limit; and
   based on determining that the number of instances in which account costs were imposed during a particular time period in response to executing the triggers is below the lower control limit or exceeds the upper control limit, transmitting, with a processor, an outlier notification to a predefined analyst.

9. The method of claim 8, wherein the offer to the user associated with forgiving the account costs includes one or more options to avoid account costs, wherein the options to avoid account costs are selected from the group consisting of linking an account to the account that incurred costs, changing an account type for the account that incurred costs, and transferring funds to the account that incurred costs.

10. The method of claim 8, wherein executing triggers further comprises:
- calculating the total value of the outbound transactions that occur during a first period of time and the total value of the inbound transactions the occur during the first period of time; and
- comparing the value of the outbound transactions and the total value of the inbound transactions.

11. The method of claim 10, wherein:
- executing triggers further comprises determining that the total value of the outbound transactions is greater the total value of the inbound transactions by a specific amount; and
- the offer to the user associated with forgiving the account costs comprises a recommendation to the user comprising transferring the specific amount from a first account to a second account before the start of a second period of time, wherein the first period of time comprises a period of time that is prior to the second period of time.

12. The method of claim 11, wherein the outbound transactions comprise automatic withdrawals, internal transfers, and payments.

13. The method of claim 8, wherein imposing account costs comprises imposing the first cost on an account for a predetermined time period.

14. A computer program product for monitoring of one or more accounts of a financial institution, the computer program product comprising:
- a computer readable storage medium having computer readable program code embodied therewith, the computer readable program code comprising:
- computer readable program code configured to receive account data associated with one or more accounts;
- computer readable program code configured to identify triggers comprising account activity indicative of a risk event;
- computer readable program code configured to execute triggers to monitor financial account ratios, wherein executing triggers comprises imposing account costs in response to determining a particular financial account ratio;
- computer readable program code configured to trigger a notification to a user of the account costs when the account costs are imposed, the notification comprising an offer to a computing device associated with the user associated with forgiving the account cost;
- computer readable program code configured to segregate the account data into a plurality of time periods;
- computer readable program code configured to calculate the number of instances in which account costs were imposed during each time period in response to executing the triggers;
- determine whether the number of instances in which account costs were imposed during each time period in response to executing the triggers is within a lower control limit and an upper control limit; and
- based on determining that the number of instances in which account costs were imposed during a particular time period in response to executing the triggers is below the lower control limit or exceeds the upper control limit, transmit an outlier notification to a predefined analyst.

15. The computer program product of claim 14, further comprising computer readable program code configured to recommend wherein the offer to the user associated with forgiving the account costs comprises a recommendation to the user comprising transferring funds from a second account to cover the account costs incurred by the outbound transactions.

16. The computer program product of claim 14, wherein the offer to the user associated with forgiving the account costs includes one or more options to avoid account costs, wherein the options to avoid account costs are selected from the group consisting of linking an account to the account that incurred costs, changing an account type for the account that incurred costs, and transferring funds to the account that incurred costs.

17. The computer program product of claim 14, wherein imposing account costs comprises imposing the first cost on an account for a predetermined time period.

18. The computer program product of claim 14, wherein executing triggers further comprises:
- calculating the total value of the outbound transactions that occur during a first period of time and the total value of the inbound transactions the occur during the first period of time; and
- comparing the value of the outbound transactions and the total value of the inbound transactions.

19. The computer program product of claim 18, wherein:
- executing triggers further comprises determining that the total value of the outbound transactions is greater the total value of the inbound transactions by a specific amount; and
- the offer to the user associated with forgiving the account costs comprises a recommendation to the user comprising transferring the specific amount from a first account to a second account before the start of a second period of time, wherein the first period of time comprises a period of time that is prior to the second period of time.

* * * * *